United States Patent [19]

Panoch et al.

[11] 4,386,197

[45] May 31, 1983

[54] HOT-MELT ADHESIVE COPOLYAMIDE HAVING RESISTANCE TO ENGINE FUELS

[75] Inventors: Hans J. Panoch; Heinz Scholten, both of Haltern; Rainer Feldmann, Marl, all of Fed. Rep. of Germany

[73] Assignee: Chemische Werke Hüls A.G., Marl, Fed. Rep. of Germany

[21] Appl. No.: 155,670

[22] Filed: Jun. 2, 1980

[30] Foreign Application Priority Data

Jun. 15, 1979 [DE] Fed. Rep. of Germany ....... 2924323

[51] Int. Cl.$^3$ ............................................ C08G 69/14
[52] U.S. Cl. ................................... 528/324; 528/310; 528/326; 428/458
[58] Field of Search ....................... 528/324, 310, 326

[56] References Cited

U.S. PATENT DOCUMENTS

| Re. 27,939 | 3/1974 | Raabe | 528/324 |
| 3,839,121 | 10/1974 | Schmitt et al. | 528/324 |
| 3,850,887 | 11/1974 | Halas et al. | 528/324 |
| 4,101,534 | 7/1978 | Ueno et al. | 525/432 |
| 4,102,871 | 7/1978 | Horn et al. | 528/324 |
| 4,196,108 | 4/1980 | Hinze et al. | 525/432 |

FOREIGN PATENT DOCUMENTS 7630851 6/1978 France ............................... 528/324

OTHER PUBLICATIONS

English Language Translation of W. German Pat. No. 2,444,560, 4–76.
Handbook of Chemistry and Physics, p. C-7.
Principles and Practice, p. 10.

Primary Examiner—Harold D. Anderson
Attorney, Agent, or Firm—Wells & Wells

[57] ABSTRACT

Hot-melt adhesives for articles which come into contact with organic fuels for internal engines comprising binary copolyamides having:

A. 50–90 percent by weight of lactams or ω-aminocarboxylic acids having at least 10 methylene groups; and B. 50–10 percent by weight of equimolar quantities of aliphatic dicarboxylic acids and of aliphatic or cycloaliphatic diamines in which the total of the methyl, methylene and/or methylidyne groups present is at least 13.

The extractable content in the copolyamide hot-melt adhesive is not more than 5 percent by weight as determined after 9 hours in boiling ethanol.

12 Claims, No Drawings

HOT-MELT ADHESIVE COPOLYAMIDE HAVING RESISTANCE TO ENGINE FUELS

CROSS-REFERENCE TO A RELATED APPLICATION

Applicants claim priority under 35 USC 119 for application P No. 29 24 323.0, filed June 15, 1979 in the Patent Office of the Federal Republic of Germany.

BACKGROUND OF THE INVENTION

The field of the invention is synthetic resins containing mixtures of two or more solid polyamides. The invention is particularly concerned with the use of binary copolyamides as hot-melt adhesives for articles which come into contact with fuels for internal combustion engines. In particular, the adhesives are intended to achieve a particularly good resistance to lower alcohols, especially ethanol, methanol and isopropanol, which are becoming more and more important as fuel additives and as fuels alone for engines.

The state of the art of hot-melt adhesives may be ascertained by reference to U.S. Pat. Nos. 4,101,534 and 4,196,108; West German Published Application No. 24 44 560 and the Kirk-Othmer, "Encyclopedia of Chemical Technology", 3rd Edition, Vol. 1 (1978) under the section "Adhesives", pp. 488–510, particularly p. 499, where it is disclosed that "Hot-melt adhesive applicators are really miniature thermostatically controlled extruders similar to those used to extrude thermoplastics", p. 503, where the automotive uses are disclosed, p. 506 where plastics joining is disclosed, and pp. 506–507 where the energy limitations of hot-melt adhesives are disclosed, the disclosures of which are incorporated herein.

Hot-melt adhesives of the prior art, for example those based on ethylene/vinyl acetate copolymers (EVA), copolyesters or copolyamides are unsuitable for adhesive bonds on parts which come into contact with engine fuels because of their low resistance to the fuels.

U.S. Pat. No. 4,101,534 discloses a metal-bonding adhesive composition consisting of 95–60% by weight, based on the total composition, of an aliphatic homopolyamide and 5–40% by weight, based on the total composition, of an aliphatic copolyamide, the homopolyamide being a crystalline homopolyamide having up to 14 amide groups per 100 carbon atoms, and the copolyamide consisting of 90–70% by weight of (1) a polyamide having up to 14 amide groups per 100 carbon atoms and 10–30% by weight of (2) at least one polyamide whose recurring units are different from those of the polyamide (1).

According to U.S. Pat. No. 4,196,108, a polyamide resin useful as a hot melt adhesive consisting of recurring units is obtained by reacting in an inert atmosphere at a temperature of 180°–300° C. while removing water of reaction:

(a) 10–50% by weight, based on the total composition, caprolactam;

(b) 10–50% by weight, based on the total composition, of a polyamide or polyamide salt derived from hexamethylene diamine and an alpha-omega dicarboxylic acid of the formula HOOC—$R_1$—COOH where R is a $C_4$–$C_7$ bivalent aliphatic hydrocarbon radical;

(c) 10–50% by weight, based on the total composition, of a polyamide or polyamide salt derived from nonamethylene diamine and an alpha-omega dicarboxylic acid of the formula HOOC—$R_1$—COOH where $R_1$ is $C_7$–$C_{10}$ bivalent aliphatic hydrocarbon radical; and (d) an amount up to 50% by weight, based on the total composition, of a polymeric fatty acid and alpha-omega aliphatic diamine of the formula $H_2N$—$R_2$—$NH_2$ where $R_2$ is a $C_5$–$C_7$ alkylene radical, a polyamide or polyamide salt derived from the polymeric fatty acid and diamine.

The use of an engine fuel-resistant hot-melt adhesive which is based on binary copolyamides formed from caprolactam and lauryllactam is known from West German Published Application No. 24 44 560. The weight ratio disclosed for caprolactam:lauryllactam is between 60:40 and 30:70, especially 50:50. However, these copolyamides are only suitable for the production of fuel-resistant adhesive bonds if they are extracted with an alcohol or a halogenated hydrocarbon before being used.

Extracting hot-melt adhesives at the granule stage is a very expensive step in the production process. First, this is because of the additional outlay of labor, and second, because of the costs of the extraction agent and its redistillation. Above all, however, the cost is high because of the high loss in material, which in the case of ethanol, can be up to 50 percent by weight for the copolyamides described in West German Published Application No. 24 44 560. The granules swell considerably during extraction and this swelling leads to fractures and finally to the disintegration of the granules to give fine grit. The conveyance of such irregular grit, which contains considerable fine dust, in the screw metering extrusion apparatus used for applying hot-melt adhesives is, of course, not free from problems.

The high solubility and the considerable fracture due to swelling of the prior art binary hot-melt adhesives formed from lauryllactam and caprolactam make it evident that the extraction step is necessary, otherwise the adhesive joint disintegrates when in contact with the polar solvent content in fuels, and as a result of the loss of material there are fractures due to the swelling.

SUMMARY OF THE INVENTION

Having in mind the limitations of the prior art, it is an object of the present invention to provide engine fuel-resistant hot-melt adhesives which entirely meet the demands made without an extraction stage and the disadvantageous consequences for processing. This object is achieved by using binary copolyamides containing, as the fundamental unit (repeating unit), 50–90 percent by weight of lactams or ω-aminocarboxylic acids having at least 10 methylene groups, preferably 10 to 12 groups, and 50–10 percent by weight of equimolar quantities of aliphatic dicarboxylic acids and of aliphatic or cycloaliphatic diamines in which the total of the methyl, methylene and/or methylidyne groups present is at least 13, preferably 13 to 49, and especially 13 to 25, groups, the extractable fraction in the copolyamide being not more than 5 percent by weight, determined after 9 hours in boiling ethanol. The ratio by weight of the lactams or ω-aminocarboxylic acids to the equimolar quantities of dicarboxylic acids and diamines is advantageously in the range of 70 up to 90:30 down to 10.

ω-Aminocarboxylic acids or lactams thereof having at least 10 methylene groups are, accordingly, 11-aminoundecanoic acid (AUA: 10 methylene groups) or lauryllactam (LL: 11 methylene groups); lauryllactam being preferred.

DESCRIPTION OF THE PREFERRED EMBODIMENTS

The following examples illustrate aliphatic and cycloaliphatic dicarboxylic acids useful in the present invention: adipic acid (AA), sebacic acid (SA), azelaic acid (AzA), decanedicarboxylic acid (DDA), trimethyladipic acid, succinic acid, tetramethylpimelic acid, hexahydroterephthalic acid (HHTA) and dimeric fatty acids, for example those prepared in accordnace with U.S. Pat. No. 3,157,681. Especially useful are sebacic acid (SA) azelaic acid (AzA), decanedicarboxylic acid (DDA) and tetramethylpimelic acid.

The following are mentioned as examples of suitable aliphatic diamines: hexamethylenediamine (HMD), trimethylhexamethylenediamine (TMD), 5-methylnonamethylenediamine, decamethylenediamine (DEMD), dodecamethylenediamine (DMD) and 2,4-dimethyloctamethylenediamine. Especially useful diamines are hexamethylene diamine (HMD) decamethylene diamine (DEMD) and trimethylhexamethylene diamine (TMD).

Cycloaliphatic diamines which may be mentioned are isophoronediamine (IPD=3-aminomethyl-3,5,5-trimethylcyclohexylamine), bis-(p-aminocyclohexyl)-methane, 1,4-bisaminomethylcyclohexane and bis-(3,3'-dimethyl-4,4'-diaminocyclohexyl)-methane especially isophorone-diamine (IPD).

In general, the total of the non-functional carbon atoms in the lactams or the ω-aminocarboxylic acids and the non-functional carbon atoms of the dicarboxylic acids and diamines should be at least 23. Expressed in another way, it is advantageous to select combinations such that the number of carbon atoms between the carboxamide groups is as large as possible. A number of binary copolyamides which satisfy the number of carbon atoms defined, are listed in the following table.

TABLE I

|  | C* number | Dicarboxylic acid | C* number | Diamine | C* number | Total C* numbers |
|---|---|---|---|---|---|---|
| Lauryllactam | 11 | Decanedicarboxylic acid | 10 | Hexamethylene diamine | 6 | 27 |
| Lauryllactam | 11 | Decanedicarboxylic acid | 10 | Isophorone diamine | 10 | 31 |
| Lauryllactam | 11 | Decanedicarboxylic acid | 10 | Dodecamethylene diamine | 12 | 33 |
| Lauryllactam | 11 | Adipic acid | 4 | Trimethylhexamethylene diamine | 9 | 24 |
| Lauryllactam | 11 | Adipic acid | 4 | Isophorone diamine | 10 | 25 |
| ω-Aminoundecanoic | 10 | Decanedicarboxylic acid | 10 | Hexamethylene diamine | 6 | 26 |

*of the non-functional methyl, methylene and methine groups

In addition to the defined chain length of the fundamental (repeating) units of the copolyamides, it is necessary too, only to select combinations such that the proportion of extractable constituents in the copolyamide is not more than 5 percent by weight, especially at 0.5 to 4.5 percent by weight (determined after an extraction time of 9 hours in boiling ethanol). The determination is carried out on 2 mm granules in a hot Soxhlet extraction apparatus.

It is evident from Table 2, which follows, that useful copolyamides are obtained only if all the conditions are maintained, and especially that, in addition to the selection of the co-components, the ratio in which the latter are mixed is also critical. Thus, for example, the formulations of Table 2 marked "CE" are not in accordance with the invention, because of the high extractable fraction.

TABLE II

| | Mixing ratio (% by weight) of the copolyamide components | C number* | Yield point (°C.) | Proportions extractable in boiling ethanol (% by weight) |
|---|---|---|---|---|
| | LL-DDA/HMD | 11 + (10 + 6) | | |
| CE | 50:50 | | 159 | 15 |
| | 65:35 | | 148 | ~5 |
| | 70:30 | | 152–154 | 4.5 |
| | 75:25 | | 156 | 3 |
| | 85:15 | | 164 | 2 |
| | LL-DDA/IPD | 11 + (10 + 9) | | |
| CE | 70:30 | | 149–150 | 12 |
| | 75:25 | | 155–156 | 3.5 |
| | 80:20 | | 159 | 2.5 |
| | 85:15 | | 164 | 2 |
| | 90:10 | | 170 | 1.5 |
| | LL-DDA/DMD | 11 + (10 + 12) | | |
| CE | 30:70 | | 165–168 | 6 |
| | 50:50 | | 161–166 | 1.7 |
| | 70:30 | | 167 | 2 |
| | 75:25 | | 169 | 1.5 |
| | 80:20 | | 171 | 1.0 |
| | LL-AA/TMD | 11 + (4 + 9) | | |
| | 75:25 | | 148 | 4.5 |
| | 80:20 | | 155 | 3.3 |
| | 85:15 | | 160 | 2.5 |
| | 90:10 | | 165 | 1.5 |
| | LL-AA/IPD | 11 + (4 + 9) | | |
| | 75:25 | | 150 | 5 |
| | 80:20 | | 156 | 5 |
| | 85:15 | | 160 | 3 |
| | 90:10 | | 166 | 1.8 |
| | AUA-DDA/HMD | 10 + (10 + 6) | | |
| | 70:30 | | 155 | 5 |
| | 80:20 | | 165 | 4 |

*of the methyl, methylene or methine groups
CE = Comparison Examples

Copolyamides which are particularly suitable are those formed from LL-DDA/HMD in a ratio by weight of 65:35 to 70:30 and from LL-DDA/IPD in a ratio by weight of 75:25 to 80:20.

The copolyamides are obtained by a hydrolytic polycondensation reaction at temperatures from 260° to 280° C. and pressures from 18 to 20 bars, releasing the steam formed and granulating the melt which has been shaped into strands.

The molecular weight, expressed as the relative solution viscosity $\eta_{rel}$ (determined in 0.5% strength m-cresol solution at 25° C.) is usually in the range from 1.40 to 1.70, and is advantageously 1.40 to 1.65. It is advantageous to adjust the molecular weight by using the dicarboxylic acid in an excess of 0.5 to 2.5 mol percent, relative to the total molar number of the components. The yield points of the copolyamides quoted, that is to say the temperature above which the adhesive can be processed in the form of a melt, should advantageously not be below 140° C. With the customary bonding conditions, using electrically heated equipment, a yield point not higher than 170° C. is preferred.

The binary copolyamides of the present invention are suitable, for example, for bonding fuel filters, headlights and other components on motor vehicles or equipment which come into contact with polar solvents or fuels containing the latter.

The bonding strength of the hot-melt adhesives is tested on cross-cut and overlapped joints as specified in German Industrial Standard DIN 53,284 on an Al-Cu-Mg alloy 2 pl F 43 after storage for 48 hours at 60° C. in a test liquid consisting of a mixture of 50% by volume of benzene, 25% by volume of isooctane, 15% by volume of gasoline and 10% by volume of ethanol.

The bonding strength of the copolyamides of the examples and comparison examples is shown in Table 3 which follows.

TABLE III

| Copolyamide | $\eta_{rel}$ | Bonding Strength room temp. °K. | kp/cm² | Extractable content |
|---|---|---|---|---|
| Example | | | | |
| 1 Lauryllactam/dodecane-dicarboxylic acid/hexamethylenediamine % by weight 70:30 C number 11 + (10 + 6) | 1.65 | 300 | 150 | 4.5 |
| 2 Lauryllactam/dodecane-dicarboxylic acid/isophoronediamine % by weight 80:20 C number 11 + (10 + 10) | 1.64 | 320 | 155 | 2.5 |
| 3 Lauryllactam/dodecane-dicarboxylic acid/dodecamethylenediamine % by weight 50:50 C number 11 + (10 + 12) | 1.62 | 300 | 145 | 1.7 |
| 4 Lauryllactam/adipic acid/isophoronediamine % by weight 80:20 C number 11 + (4 + 10) | 1.54 | 300 | 140 | 5 |
| Comparison Example | | | | |
| 1 Caprolactam/lauryllactam % by weight 50:50 C number 5 + 11 | 1.50 | 206 | failure | 50 |
| 2 As Comparison Example 1, but extracted in methylene chloride | 1.50 | 310 | 135 | 26 |
| 3 Lauryllactam/adipic acid/hexamethylene diamine % by weight 70:30 C number 11 + (4 + 6) | 1.70 | 300 | failure | 11 |
| 4 Caprolactam/adipic acid/hexamethylene diamine % by weight 50:50 | 1.59 | 300 | failure | 70 |

TABLE III-continued

| Copolyamide | $\eta_{rel}$ | Bonding Strength room temp. °K. | kp/cm² | Extractable content |
|---|---|---|---|---|
| C number 5 + (4 + 6) | | | | |

We claim:

1. A hot melt adhesive comprising a binary copolyamide consisting of the polymeric reaction product of:
   (a) about 50–90 percent by weight of a lactam or an ω-aminocarboxylic acid having at least 10 methylene groups; and
   (b) about 50–10 percent by weight of equimolar quantities of an aliphatic dicarboxylic acid and a diamine, said diamine selected from the group consisting of aliphatic diamines and cycloaliphatic diamines, said dicarboxylic acid and said diamine having a total of at least 13 methyl groups, methylene groups, methylidyne groups or a mixture of said groups; wherein said components (a) and (b) are mixed in a ratio which provides said copolyamide having an extractable content not more than 5 percent by weight as determined after 9 hours in boiling ethanol.

2. The copolyamide of claim 1, wherein (a) is about 70–90% by weight and (b) is about 30–10% by weight.

3. A hot-melt adhesive for use with articles which come into contact with organic fuels for internal combustion engines comprising a binary copolyamide consisting of the polymeric reaction product of
   (a) about 50–90 percent by weight of a lactam or an ω-aminocarboxylic acid having at least 10 methylene groups; and
   (b) about 50–10 percent by weight of equimolar quantities of an aliphatic dicarboxylic acid and a diamine, said diamine selected from the group consisting of aliphatic diamines and cycloaliphatic diamines, said dicarboxylic acid and said diamine having a total of at least 13 methyl groups, methylene groups, methylidyne groups or a mixture of said groups; wherein said components (a) and (b) are mixed in a ratio which provides said copolyamide having an extractable content not more than 5 percent by weight as determined after 9 hours in boiling ethanol.

4. The adhesive of claim 3, wherein (a) is about 70–90% by weight and (b) is about 30–10% by weight.

5. The adhesive of claim 3, wherein (a) has 10 to 12 methylene groups and (b) has 13 to 49 methyl groups, methylene groups, methine groups or a mixture of said groups.

6. The adhesive of claim 5, wherein (a) is selected from the group consisting of lauryllactam and ω-aminoundecanoic acid and (b) is selected from the group consisting of decanedicarboxylic acid/hexamethylene diamine, decanedicarboxylic acid/isophorone diamine, decanedicarboxylic acid/dodecamethylene diamine, adipic acid/trimethylhexamethylene diamine, adipic acid/isophorone diamine, and decanedicarboxylic acid/hexamethylene diamine.

7. The adhesive of claim 6, wherein (a) is lauryllactam and (b) is decanedicarboxylic acid/hexamethylene diamine.

8. The adhesive of claim 6, wherein (a) is lauryllactam and (b) is decanedicarboxylic acid/isophorone diamine.

9. The adhesive of claim 7, wherein the weight ratio (a) to (b) is 65:35 to 70:30.

10. The adhesive of claim 8, wherein the weight ratio (a) to (b) is 75:25 to 80:20.

11. The adhesive of claim 1, wherein said extractable content is 0.5 to 4.5 percent.

12. The adhesive of claim 3, wherein said extractable content is 0.5 to 4.5 percent.

* * * * *